(12) United States Patent
Mezzino

(10) Patent No.: US 11,408,491 B2
(45) Date of Patent: Aug. 9, 2022

(54) ELECTROMECHANICAL ACTUATOR ASSEMBLY

(71) Applicant: Microtecnica S.r.l., Turin (IT)

(72) Inventor: Giacomo Mezzino, Turin (IT)

(73) Assignee: MICROTECNICA S.R.L., Turin (IT)

( * ) Notice: Subject to any disclaimer, the term of this patent is extended or adjusted under 35 U.S.C. 154(b) by 0 days.

(21) Appl. No.: 17/126,679

(22) Filed: Dec. 18, 2020

(65) Prior Publication Data

US 2021/0190185 A1 Jun. 24, 2021

(30) Foreign Application Priority Data

Dec. 19, 2019 (EP) ................................. 19218318

(51) Int. Cl.
*F16H 25/20* (2006.01)
*F16H 25/24* (2006.01)

(52) U.S. Cl.
CPC ......... *F16H 25/20* (2013.01); *F16H 25/2454* (2013.01); *F16H 2025/2078* (2013.01)

(58) Field of Classification Search
CPC ................. F16H 25/20; F16H 25/2454; F16H 2025/2078
See application file for complete search history.

(56) References Cited

U.S. PATENT DOCUMENTS

| | | | | |
|---|---|---|---|---|
| 2,660,029 A * | 11/1953 | Geyer | ..................... | F15B 13/10 60/709 |
| 3,050,943 A * | 8/1962 | Thorel | ..................... | F16H 27/02 91/459 |
| 3,483,765 A * | 12/1969 | Fornataro | ........... | F16H 25/2018 74/89.14 |
| 4,628,752 A | 12/1986 | Paxton et al. | | |
| 4,637,272 A | 1/1987 | Teske et al. | | |
| 5,214,972 A * | 6/1993 | Larson | .................. | F16H 25/205 74/89.26 |
| 5,649,451 A * | 7/1997 | Ruland | ................ | B23Q 1/4828 74/89.3 |
| 7,100,465 B1* | 9/2006 | Hollis | ................. | F16H 25/2204 74/411.5 |
| 7,190,096 B2* | 3/2007 | Blanding | ............ | F16H 25/2015 310/112 |

(Continued)

FOREIGN PATENT DOCUMENTS

| | | |
|---|---|---|
| EP | 2505495 A1 | 10/2012 |
| JP | 2008008470 A | 1/2008 |
| KR | 20180021273 A | 3/2018 |

OTHER PUBLICATIONS

European Search Report for Application No. 19218318.4, dated Jun. 4, 2020, 28 pages.

*Primary Examiner* — David M Fenstermacher
(74) *Attorney, Agent, or Firm* — Cantor Colburn LLP

(57) ABSTRACT

An electromechanical actuator assembly comprises a first actuator and a second actuator. The first actuator and the second actuator are coupled together end-to-end and are independently operable. A method of actuating a moveable element using an actuator assembly, comprises: coupling a first actuator between a fixed structure and a second actuator so that the first actuator is operable to move the second actuator relative to the fixed structure; coupling the second actuator to the moveable element; and moving the moveable element by moving the second actuator using the first actuator.

11 Claims, 3 Drawing Sheets

(56) References Cited

U.S. PATENT DOCUMENTS

| | | | |
|---|---|---|---|
| 7,883,054 B2 | 2/2011 | Elliott et al. | |
| 8,136,418 B2* | 3/2012 | Behar | B64C 13/341 |
| | | | 74/89.23 |
| 8,230,750 B2* | 7/2012 | Flatt | B64C 13/341 |
| | | | 74/89.38 |
| 9,016,151 B2* | 4/2015 | Golding | F16H 25/205 |
| | | | 74/89.29 |
| 9,024,491 B2* | 5/2015 | Wakita | H02K 16/00 |
| | | | 310/80 |
| 9,797,490 B2* | 10/2017 | Marvin | B64C 13/341 |
| 9,884,676 B2* | 2/2018 | Cremiere | B64C 13/505 |
| 10,066,715 B2* | 9/2018 | Larson | F16H 25/2015 |
| 10,549,848 B2* | 2/2020 | Klim | B64C 25/20 |
| 11,105,404 B2* | 8/2021 | Borgarelli | F16H 25/2454 |
| 2004/0007923 A1* | 1/2004 | Tesar | F16H 25/2252 |
| | | | 310/12.24 |
| 2014/0049140 A1 | 2/2014 | Wakta | |
| 2019/0101195 A1 | 4/2019 | Kwasniewski | |

\* cited by examiner

ELECTROMECHANICAL ACTUATOR ASSEMBLY

FOREIGN PRIORITY

This application claims priority to European Patent Application No. 19218318.4 filed Dec. 19, 2019, the entire contents of which is incorporated herein by reference.

FIELD

The invention relates to an electromechanical actuator assembly, particularly to an electromechanical actuator assembly comprising a first actuator and a second actuator.

BACKGROUND

It is important to provide various types of redundancy in systems comprising actuators, e.g. in order to mitigate against the risk of total failure. Actuators may experience various failures, including jamming of shafts, electrical failure, motor failure and so on. Typically, redundancy for actuators is achieved by providing a back-up drive mechanism which is arranged to take over functionality in the event that a primary drive mechanism fails. It is therefore necessary to include complicated clutches, mechanical fuses, or other failure-induced mechanism to automatically transition between primary and back-up drive mechanisms. As such, redundant actuators are typically complex. In addition, the back-up drive mechanism may be less capable that the primary system, resulting in slow, damped, or limited functionality.

Further, the time needed to switch to the back-up drive mechanism (e.g. due to disengaging the primary drive mechanisms and subsequently engaging the back-up mechanism) can result in a temporary loss of functionality, as well as in a delay in detecting the failure. There is therefore a desire for improved actuators that address these drawbacks.

SUMMARY

According to a first aspect of the present invention there is provided an electromechanical actuator assembly comprising a first actuator and a second actuator, wherein the first actuator and the second actuator are coupled together end-to-end and are independently operable.

The first actuator is independently operable to the second actuator so that each actuator may be operated without any input from the other. That is, each actuator may be arranged to operate without the other changing its own configuration. Each actuator may provide only a portion of the displacement that is available during normal use. The assembly may therefore comprise two distinct and parallel operational channels, one for each actuator. As such, the operation of each actuator may be fully separate from the other and may therefore provide a redundancy for the other. Thus, in the event of failure of one actuator (e.g. by jamming, or electrical failure etc.), operation of the other is not affected. Further, there is no delay in maintaining functionality in the assembly since each actuator provides a portion of the available displacement.

The first actuator is coupled end-to-end with the second actuator so that operation of the first actuator may in use cause movement (e.g. translation) of the second actuator. The actuator assembly may be configured to be an in-line assembly e.g. serving as at least a portion of a mechanical connection between a fixture and an element moveable relative to the fixture. That is, the first and second actuators may be arranged together in a chain, each providing a fraction (e.g. half) of the available displacement from the assembly. The assembly may therefore be arranged so that in use the first actuator is operable to relocate the second actuator. The second actuator may then be operated to further extend (e.g. expand) the assembly for actuation of e.g. a moveable element such as a flight control surface or the like. The entirety of the second actuator may be relocated by actuation of the first actuator. The configuration of the second actuator may be unchanged by its relocation by the first actuator. Thus, the assembly may provide an expandable linkage (e.g. an in-line linkage or mechanical coupling) for actuating a moveable element.

In the discussion herein, the first and second actuators may be similar or identical, and therefore elements of the first actuator may be referred to as "first" versions and elements of the second actuator may be referred to as "second" versions. For example, a housing of the first actuator may be referred to as a first housing and a housing of the second actuator may be referred to as a second housing. Given the commonality between the first and second actuators, any description herein with respect to one actuator and its elements should be understood to apply also to the second actuator. However, it should also be understood that features described herein may be embodied in either or both actuators e.g. as required by a particular application.

Each actuator may comprise a housing and an actuating member, and each actuator may be operable to drive the actuating member relative to the housing. (Depending on the frame of reference, each actuator can also be understood to drive the housing relative to the actuating member). The housing may house and/or substantially house the actuating member, at least in a retracted configuration of the actuator. Thus, the housing may surround and enclose a portion of the actuating member. The housing may house other components of the actuator e.g. a motor, a stator, a ballscrew, a locking mechanisms etc. The actuating member may be relocated (i.e. translated) with respect to the housing, for example by extending from the housing or retracting into the housing. Thus, upon operation of each actuator, the respective actuating member is driven relative to the housing, into or out of the housing.

The actuating members of each actuator may be distinct from each other. They may be separately and independently actuable, and may not be coupled to each other. The assembly may therefore comprise two separate actuating members, each one associated with a respective actuator. The first actuating member may be repositionable (i.e. translatable) relative to the second actuating member and vice versa. The first actuating member may be rotatable (e.g. freely rotatable) with respect to the second actuating member and vice versa. The actuator may therefore be arranged so that in the event of one actuating member jamming, the operation of the other is unaffected.

The assembly may be arranged so that in use the first housing and/or second housing is moveable. The housing may be arranged to carry wire, components, and/or connections and may contain all components of the actuator. The housing may carry and/or house a motor or other mechanism for driving the actuating member to move position relative to the housing. In use, the actuating member (e.g. the first actuating member) may be stationary (e.g. by being coupled to a stationary fixture) so that upon operation, the housing and other components of the first actuator are moved (i.e.

relocated) rather than the actuating member. Of course, either the first or second actuating member may be fixed as needed.

Each actuating member may be a screwshaft, and each actuator may comprise a nut disposed about the screwshaft and arranged to be rotated to thereby drive the screwshaft relative to the housing (or drive the housing relative to the screwshaft, as the case may be). Each nut may be within the respective housing. The location of the nut within the housing may be fixed, though the nut may be arranged to rotate e.g. about a fixed point within the housing. The nut may therefore be arranged to rotate within the housing, but to maintain its position relative to the housing. The actuator may be arranged so that rotation of the nut drives the screwshaft for actuation e.g. by cooperation of the nut with threads of the screwshaft. Rotation of the nut may translate it along the screwshaft e.g. in either direction as needed. Then, when the screwshaft is fixed in position, rotation of the nut will drive movement of the housing. The nut may be a ballnut or any suitable device for driving the screwshaft.

The nut of each actuator may be arranged to be irreversible. That is, each nut may be arranged so as not to rotate unless driven. Each nut may be arranged so that it will not rotate when subject to thrust forces e.g. forces along the screwshaft. Therefore, each nut may be configured not to rotate in the event that the assembly is subjected to tensile or compressive forces. The assembly may therefore be arranged so that force on the actuator does not cause the assembly to contract or expand unwantedly. The irreversibility of the nuts may also prevent operation of one actuator causing relative movement of the nut and screwshaft of the other actuator. Each nut may therefore be arranged so than in the event of a failure of the actuator, the nut will not move relative to the screwshaft. The screwshaft may be an ACME screw or the like.

The actuating member of the first actuator may be arranged to be driven in a direction substantially opposite to that of the actuating member of the second actuator. That is, the assembly may be arranged so that the first actuating member extends from the housing in a direction opposite to the direction in which the second actuator extends from the housing. Thus, both the first housing and the second housing may be moved in use by operation of the first actuator.

The housing of the first actuator may be rigidly coupled to the housing of the second actuator. The housings of the actuators may be coupled so that relative rotation therebetween is not possible. The housings may be separately formed and coupled together e.g. by a fixture, mechanical coupling or the like. The housings may be distinct from one another.

The first actuator and the second actuator may each comprise an electric motor operable to drive the respective actuating member. For example, the electric motor may be arranged to drive the nut in rotation. The electric motor may be contained within the housing and may be disposed about the actuating member. The electric motor may be in a fixed position relative to the housing.

The electric motor may comprise a stator embedded within the housing. The stator may therefore be immovable relative to the housing. The nut may be a rotor of the electric motor. Thus, the stator may be arranged to drive the nut in rotation to actuate the actuating member.

The electric motor may be arranged to drive the actuating member via a gear or a series of gears. For example, a geared motor may be used to drive the nut in rotation. Any suitable driving mechanism may be provided to motivate the actuating member relative to its respective housing, e.g. to rotate the nut about the screwshaft.

Each actuator may comprise a brake for preventing movement of the actuating member relative to the housing. For example, a brake of the first actuator may be engaged when the second actuator is driven, and vice versa, to help prevent unwanted movement of the first actuator. The brake may be arranged to prevent rotation of the nut about the screwshaft. The brake may be arranged to prevent relative movement of between the actuating member and the housing. The brake may be an electrical brake, a hydraulic brake, or any suitable mechanism for preventing relative movement between the housing and actuating member. The brake may be a locking system or the like.

The brake may be arranged to be disengaged when activated. The brake may be integrated in parallel with the electrical motor. The brake may be arranged to prevent actuation (e.g. lock rotation of the nut) in the event that an electrical supply to the actuator fails. The brake may therefore be a failsafe brake. In this way, the actuator will be locked into a fixed configuration in the event that it fails, thereby enabling operation of the other actuator.

The first actuator may be identical or substantially identical to the second actuator. Thus only one actuator needs to be tested for safety and e.g. proven to be flight-worthy. The housing of each actuator may be identical, and therefore only a single part number may be needed. The assembly may comprise a coupling arranged to rigidly couple each actuator to the other, for example rigidly couple each housing to the other. The coupling may be part of the housing. Each housing may be configured to rigidly couple to another identical housing.

Since the actuators are distinct, the actuator assembly does not need a mechanism to disengage one driving mechanism or the like from another in the event of failure. Thus, the assembly may not comprise a clutch, mechanical fuse or gear box e.g. for decoupling at least one of the actuating members in the event of failure or jamming. The actuator assembly may therefore be simpler, lighter, and/or more reliable than known actuator assemblies.

Each actuator may comprise a seal disposed e.g. between the actuating member and the respective housing to enable suitable lubrication.

The first actuator (and/or second actuator) may comprise an anti-rotation feature arranged to prevent rotation of the first screwshaft relative to the first housing. The first and/or second actuator may be arranged so that the housing is not rotatable relative to the actuating member. The anti-rotation feature may be an anti-rotation connection and may comprise a pin-and-slot arrangement to allow relative translational movement without rotation. The anti-rotation feature may be a splined portion of the actuating member and may mate with a corresponding portion of the housing.

According to a second aspect of the invention there is provided a system comprising an electromechanical actuator assembly as recited herein with reference to the first aspect of the invention, wherein the first actuator is operable to move the second actuator. That is, the first actuator is actuable to relocate the second actuator.

The actuating member of the first actuator may be coupled to a fixture of the system. The fixture may be stationary (e.g. immovable relative to the wider system) and may therefore act as a base or anchor for the actuator assembly. For example, the first screwshaft may be coupled to the fixture and may therefore be immovable relative thereto. Alternatively, the first screwshaft may be hinged to fixture so that some rotation of the assembly about the fixture is possible.

Since the first actuating member is fixed in position, operation of the first actuator will cause relative movement between the first actuating member and the first housing. Thus, actuation of the first actuator may drive the first housing from an initial position to a second (e.g. final) position. The motor, the nut, the stator and so on will move with the housing. Moreover, since the housing of the second actuator may be rigidly coupled to the housing of the first actuator, operation of the first actuator may move all of the second actuator as well. Thus, operation of the first actuator may drive the entire actuator assembly except for the first actuating member. The second actuator may therefore be relocated by the first actuator. The second actuating member may be coupled to a moveable element, so that the moveable element may be displaced (e.g. relative to the fixture) by operation of the first actuator and by operation of the second actuator.

The actuator assembly may therefore provide an in-line linkage between the fixture and the moveable element. The system may therefore include an in-line, hybrid, movable housing actuator assembly configured to operate as an actuable coupling.

The system may be an aircraft or part of an aircraft. The actuating member of the second actuator may be coupled to a flight control surface or the like.

According to a third aspect of the invention there is provided a method of actuating a moveable element using an actuator assembly, comprising: coupling a first actuator between a fixture and a second actuator so that the first actuator is operable to move the second actuator relative to the fixture; coupling the second actuator to the moveable element; and moving the moveable element by moving the second actuator using the first actuator.

The method may comprise moving the movable element by actuating the second actuator. The method may therefore comprise moving the moveable element using either or both of the first actuator and the second actuator. The method may comprise moving the moveable element a first distance using the first actuator, and then moving the moveable element a second distance using the second actuator, so that the moveable element is moved a total of the sum of the first and second distances. The method may comprise relocating a housing of the first actuator which is rigidly coupled to a second housing of the second actuator, and therefore may include relocating first and second housings.

The method may comprise using an actuator assembly as described herein with reference to the first aspect of the invention. The method may comprise using a system as described herein with reference to the second aspect of the invention. The method may therefore include using any and all of the features described herein with reference to those aspects.

FIGURES

Certain preferred embodiments of the invention will be described below by way of example only and with reference to the drawings in which.

DESCRIPTION

Figure 1:
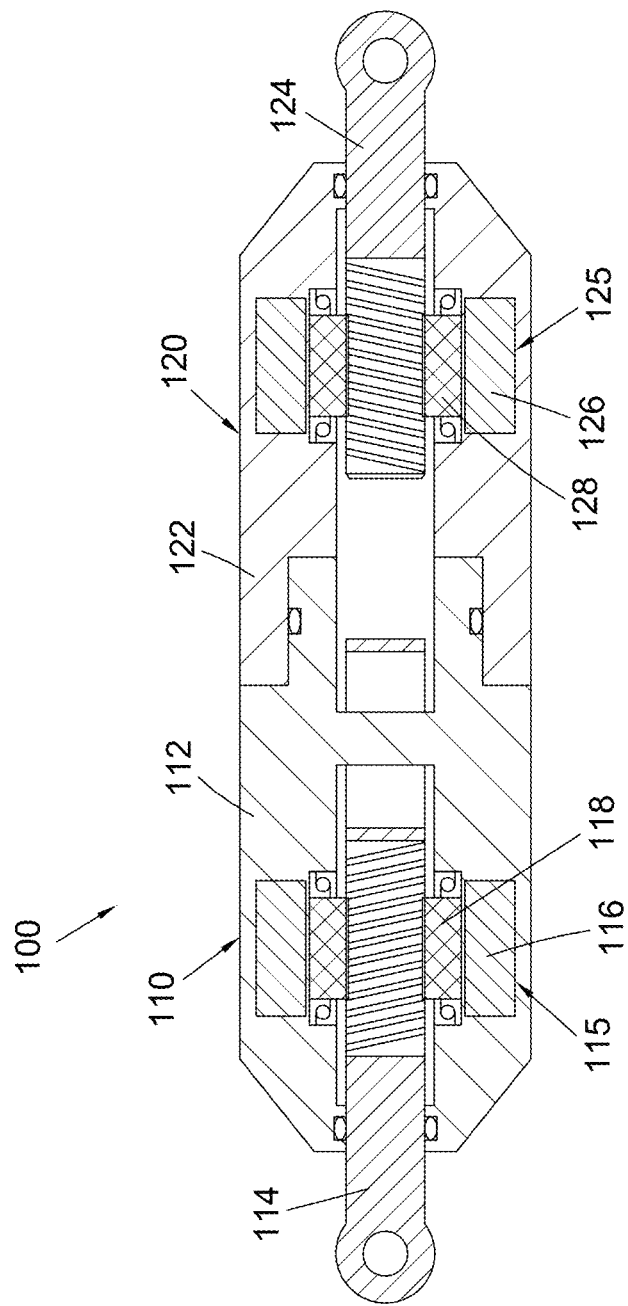
FIG. 1 shows an electromechanical actuator assembly.

FIG. 1 shows an electromechanical actuator assembly 100 comprising a first actuator 110 and a second actuator 120. The first actuator 110 comprises a housing 112 and an actuating member 114 in the form of a screwshaft, actuable relative to the housing 112. The second actuator 120 also comprises a housing 122 and an actuating member 124 in the form of a screwshaft, actuable relative to the housing 122.

Components of the first actuator 110 may be referred to herein as "first" components, and components of the second actuator 120 may be referred to as "second" components. For example, the screwshaft 114 of the first actuator 110 may be referred to as the first screwshaft 114, and the screwshaft 124 of the second actuator 120 may be referred to as the second screwshaft 124, and so on.

The first actuator 100 comprises a motor 115 arranged to drive the actuating member 114 relative to the housing 112. In particular, the motor 115 comprises a stator 116 and a nut 118 disposed about the screwshaft 114. The nut 118 is fixed at an axial location within the housing 112 (and therefore does not translate with respect to the housing 112), but is arranged to rotate about the screwshaft 114, relative to the housing 112 e.g. by provision of bearings or the like. The stator 116 is fixed within the housing 112 and is operable to rotate the nut 118 and thereby cause the screwshaft 114 to move axially relative to the housing 112 by cooperation of the nut 118 with threads of the screwshaft 114. The screwshaft 114 is extended from the housing 112 by rotation of the nut 118 in a first direction. The nut 118 may also be driven to rotate in a direction opposite to the first direction to retract the screwshaft 114 into the housing 112. The nut 118 may be a ballnut or the like.

The second actuator 120 operates in substantially the same way as the first actuator 110, and therefore includes a motor 125 comprising a stator 126 and a nut 128. The nut 128 is axially fixed within the housing 122 but is arranged to rotate relative thereto, e.g. by the provision of bearings or the like. The stator 126 is operable to rotate the nut 128 and thereby drive the screwshaft 124 relative to the housing by cooperation of the nut 128 with threads of the screwshaft 124.

The housing 112 of the first actuator 110 is coupled to the housing 122 of the second actuator 120. The actuators 110, 120 are coupled end-to-end. The coupling between the first housing 112 and the second housing 122 is rigid so that the housings cannot move relative to each other. The first and second actuators 110, 120 are therefore coupled together so that the first screwshaft 114 is actuable to extend from the first housing 112 in a direction substantially opposite to the direction in which the second screwshaft 124 is actuable to extend from the second housing 122. The first screwshaft 114 is retractable into the housing 112 in an opposite direction to that in which the second screwshaft 124 is retractable into the housing 122.

The first screwshaft 114 is separately actuable to the second screwshaft 124, and vice versa. That is, each actuator 110, 120 is operable independently of the other. The first actuator 110 is operable between a retracted configuration and an extended configuration. In the retracted configuration, the first screwshaft 114 is withdrawn into the first housing 112 as far as possible, and in the extended configuration the first screwshaft 114 is extended from the housing 112 as far as possible. The first actuator 110 is also operable to take any configuration between the retracted configuration and the extended configuration. The second actuator 120 is similarly operable between a retracted configuration and an extended configuration.

From FIG. 1 it is clear that both actuators are separately operable, and actuation of either does not rely on actuation of the other. The first screwshaft 114 is distinct from the second screwshaft 124 and vice versa. Each screwshaft is rotatable and therefore actuable relative to the other. The location of each nut 118, 128 relative to the other is fixed, but the first nut 118 is rotatable relative to the second nut 128, and vice versa. Therefore, operation of the first actuator 110 will not be affected in the event of jamming of the second actuator 120. Operation of the second actuator 120 will not be affected in the event of jamming of the first actuator 110.

Figure 2:
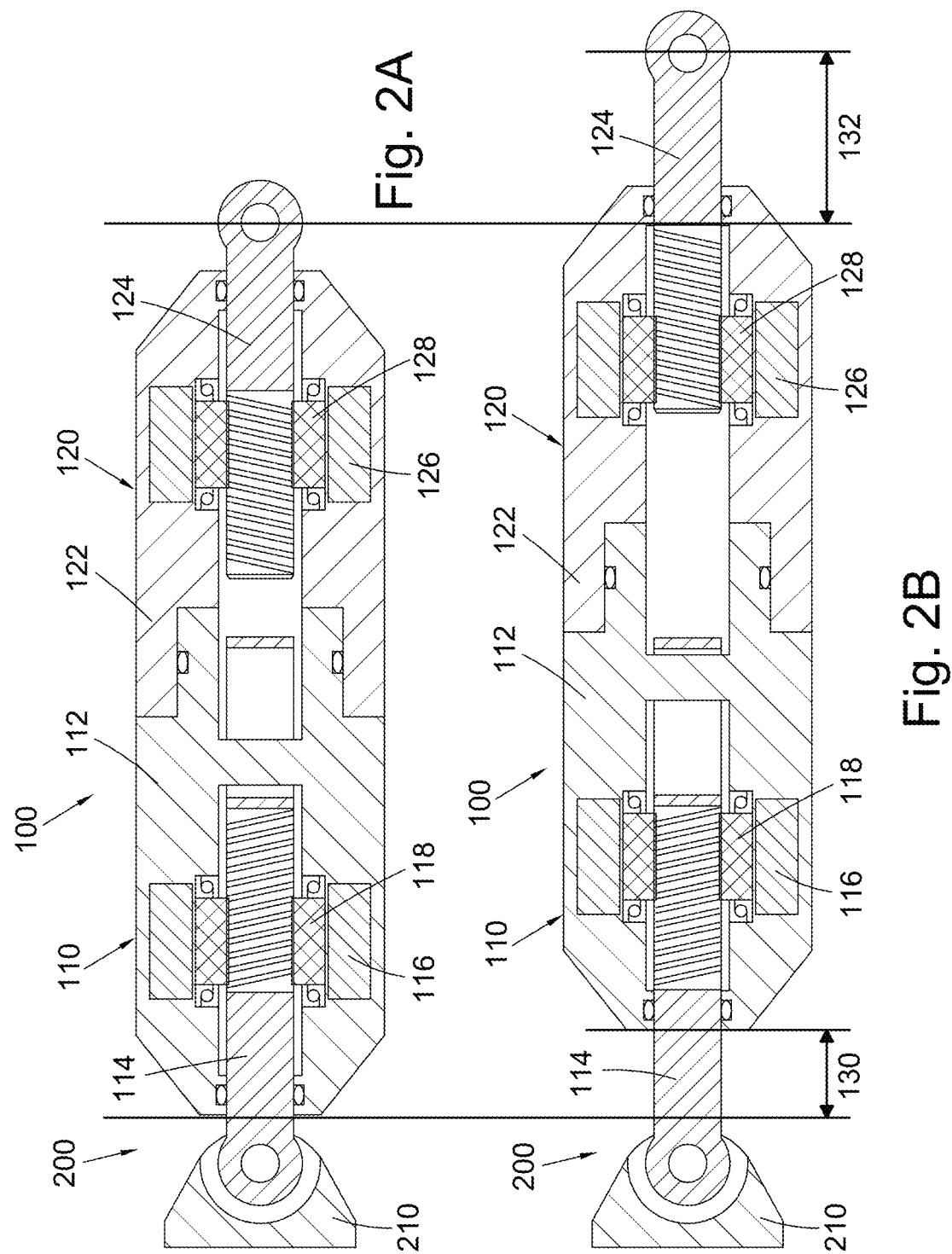
FIG. 2A shows a system comprising the electromechanical actuator assembly of FIG. 1 in a first configuration.
FIG. 2B shows the system of FIG. 2A in a second configuration.

FIGS. 2A and 2B show a system 200 comprising the actuator assembly 100, and show the operation of the actuator assembly 100. In FIG. 2A the first actuator 110 and second actuator 120 are in their respective retracted configurations, the first screwshaft 114 and the second screwshaft 124 are each fully withdrawn into their respective housings 112, 122. The screwshaft 114 of the first actuator 110 is coupled at its distal end to a fixture 210 of the system 200, such as a hinge, coupling or the like. The fixture 210 is immovable within the system 200. The system 200 may be part of an aircraft or the like, and the fixture 210 may be a structure on the fuselage or other supporting structure. In use, the fixture 210 may therefore be fixed in position (at least relative to the wider system 200) and the position of first screwshaft 114 is therefore substantially fixed (though it may be angled by a limited amount about the fixture 210 if needed e.g. if the fixture 210 is a hinge).

FIG. 2B shows the configuration of the actuator assembly 100 when the first actuator 110 is in its extended position. The first screwshaft 114 is extended from the housing 112, and since the screwshaft 114 is coupled to the fixture 210, operation of the first actuator 100 drives the housing 112 away from the fixture 210. Therefore, operation of the first actuator carries the first housing 112. The second housing 122 is rigidly coupled to the first housing 112 and the second actuator 120 is therefore carried and moved away from the fixture 210 by actuation of the first actuator 110. Thus, actuation of the first actuator 110 moves the entire actuator assembly 100 except for the first screwshaft 114.

The second actuator 120 is also shown in its extended configuration in FIG. 2B. The second screwshaft 124 is therefore extended from the second housing 122. The stroke of the first actuator 110 is shown by the distance 130, while the total stroke of the assembly is shown by the distance 132. The total stroke 132 of the assembly 100 is clearly greater than the stroke of either the first actuator 110 or second actuator 120 alone. Rather, the total stroke 132 is the combination of the stroke of the first actuator 110 and second actuator 120. The distal end of the second screwshaft 124 (at the other end of the assembly 100 to the fixture 210) may be attached to a moveable element of the system 200, such as a flight control surface or the like. The moveable element may thus be moved relative to the fixture 210 by operation of the actuator assembly 100, and particularly by operation of either or both of the first actuator 110 and the second actuator 120.

The actuator assembly 100 therefore provides an in-line, hybrid mechanical linkage between the fixture 210 and the moveable element.

In the event that either the first actuator 110 or second actuator 120 experiences a fault preventing their operation (e.g. a jam, motor failure, electric failure, and so on) the actuator assembly 100 maintains limited functionality because the first actuator 110 and the second actuator 120 are operable entirely independently of each other. The first screwshaft 114 is independent of the second screwshaft 124. Therefore, limited movement of the moveable element will still be available despite the fault. There is also no time delay associated with maintaining a degree of operation, since no clutch mechanism or the like needs to be engaged or alternative drive mechanism activated.

Moreover, since the housings 112, 122 of the actuators 110, 120 are moved during operation, each housing can carry components, wires, electrical connections, and the like. The use of electrical motors 115, 125 with stators 116, 126 may therefore be advantageous because wires can easily be provided of sufficient length to extend with movement of the housings etc.

Figure 3:
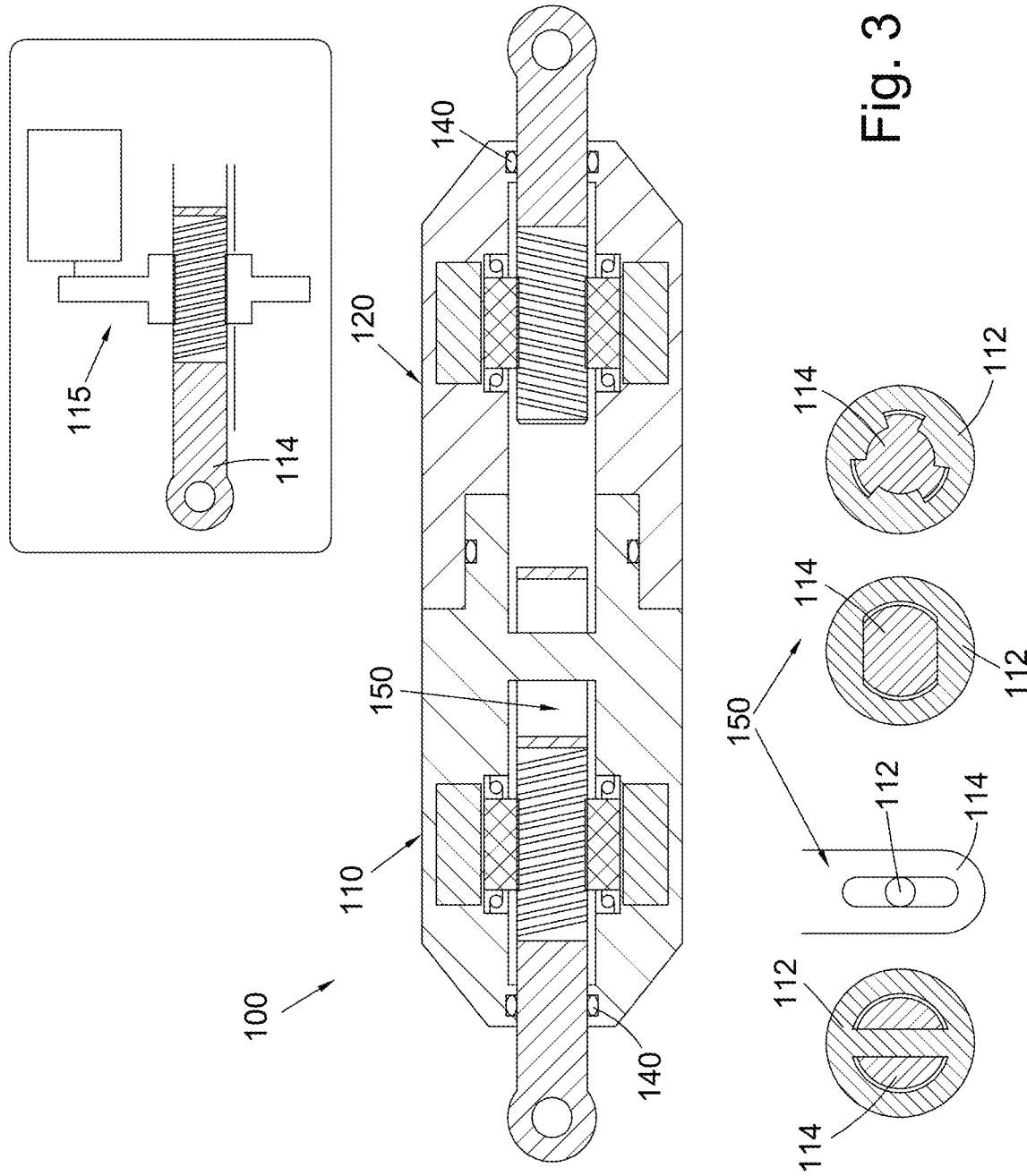
FIG. 3 shows examples of features of the electromechanical actuator assembly of FIG. 1.

FIG. 3 shows examples of certain features of the actuator assembly 100. Although the first and second actuators 110, 120 are shown each with an electrical motor 115, 125 comprising a stator 116, 126, a geared motor 115 may be used instead, arranged to rotate a nut about the screwshaft 114, 124 and thereby drive it for actuation. The insert in the top of FIG. 3 shows an example of a geared motor 115 for use with either or both of the first and second actuators 110, 120.

Each actuator 110, 120 may be provided with a locking mechanism or brake to prevent unwanted movement of the screwshaft 114, 124 relative to the housing 112, 122. The brake may be failsafe and arranged to prevent rotation of the nut 118 in the event that electrical power to the motor 115 fails. Therefore, in the event of a failure of the actuator 110, the actuator 110 may be rigid to that the second actuator can operate from a fixed position. Seals 140 may also be provided to maintain suitable lubrication of the screwshafts 114, 124, nuts 118, 128, and so on.

Since the first housing 112 and the second housing 124 are carried by the first screwshaft 114, they are not fixed in position in the system. A number of anti-rotation features are therefore provided to prevent unwanted rotation of the housings 112, 122 instead of just the nuts 118, 128.

In use, the first screwshaft 114 is coupled to the fixture 210 and is thereby prevented from rotation about its axis. An anti-rotation connection 150 is provided between the first screwshaft 114 and the first housing 112. The inserts at the bottom of FIG. 3 show examples of cross-sections of suitable anti-rotation connections 150. In the first example, a pin-like portion of the housing 112 is restrained within a slot in the screwshaft 114. The screwshaft 114 is therefore able to move into and out of the housing 112, but is prevented from rotation relative to the housing 112 by the anti-rotation connection 150 and the interaction of the pin-like portion 112 of the housing and the slot of the screwshaft 114. Cross-sections of two other examples of anti-rotation connections 150 are also shown in the inset of FIG. 3, in which it can be seen that rotation of the screwshaft 114 with respect to the housing 112 is prevented. The screwshaft may comprise a portion that mates with a portion of the housing so as not to be rotatable relative thereto e.g. by engagement of splines on the screwshaft 114 in receiving channels in the housing, or vice versa. The second housing 122 is rigidly coupled to the first housing 112 so as to prevent relative rotation therebetween. The second screwshaft 124 is coupled in use to a moveable element and may be prevented from rotation about its length by that coupling. The anti-rotation connection 150 therefore prevents the first housing 112 and second housing 122 from rotation upon operation of either motor 115, 125.

The first nut 118 and second nut 128 may also be irreversible, so that neither is rotatable by tensile or compressive forces through the assembly 100. Each nut 118, 128 may be configured not to rotate when subject to thrust forces along the length of the assembly 100. Thus, the first nut 118 may not rotate when the second nut 128 is driven for rotation to actuate the second screwshaft 128. Therefore, operation of the second actuator 120 will not cause movement of the first screwshaft 114 relative to the first housing 112. The second nut 128 may be similarly irreversible. Each nut 118, 128 may of course be driven for rotation is either direction to extend and retract the screwshafts 114, 124.

The first actuator 110 and the second actuator 120 may be substantially identical. For example, both may be provided with anti-rotation connections 150 and each of the first and second housing 112, 122 may be configured to couple to each other. Alternatively, at least the first and second housings 112, 122 first and second motors 115, 125, and/or first and second screwshafts 114, 124 may be substantially identical. Therefore, the assembly 100 may be provided by coupling identical components, and it will only be necessary to satisfy safety requirements (e.g. flight worthiness certifications or the like) for a single component, while at the same time enabling redundancy. The assembly may therefore provide for simplified manufacturing in this respect.

The invention claimed is:

1. An electromechanical actuator assembly comprising:
   a first actuator; and
   a second actuator
   wherein the first actuator and the second actuator are coupled together end-to-end and are independently operable;
   wherein the first actuator and the second actuator each comprise an electric motor disposed about the respective actuating member and operable to drive the respective actuating member;
   wherein each electric motor comprises a stator embedded within the respective housing;
   wherein the respective nut is a rotor of the electric motor and the stator is arranged to drive the nut in rotation to actuate the actuating member; and
   wherein the first actuator comprises an anti-rotation feature (150) arranged to prevent rotation of the first screwshaft relative to the first housing.

2. An assembly as claimed in claim 1, wherein the nut of each actuator is arranged to be irreversible.

3. An assembly as claimed in claim 1, wherein the actuating member of the first actuator is arranged to be driven in a direction substantially opposite to that of the actuating member of the second actuator.

4. An assembly as claimed in claim 1, wherein the housing of the first actuator is rigidly coupled to the housing of the second actuator.

5. An assembly as claimed in claim 1, wherein each electric motor is arranged to drive the respective actuating member via a gear.

6. An assembly as claimed in claim 1, wherein each actuator comprises a brake for preventing movement of the actuating member relative to the housing.

7. An assembly as claimed claim 1, wherein the first actuator is identical to the second actuator.

8. A system comprising:
   an electromechanical actuator assembly as claimed in claim 1,
   wherein the first actuator is operable to move the second actuator.

9. A system as claimed in claim 8, wherein the actuating member of the first actuator is coupled to a fixture.

10. A method of actuating a moveable element using an actuator assembly as claimed in claim 1, the method comprising:
    coupling the first actuator between a fixed structure and a second actuator so that the first actuator is operable to move the second actuator relative to the fixed structure;
    coupling the second actuator to the moveable element; and
    moving the moveable element by moving the second actuator using the first actuator.

11. A method as claimed in claim 10, comprising moving the movable element by actuating the second actuator.

* * * * *